(12) United States Patent
Briggs et al.

(10) Patent No.: US 8,708,134 B2
(45) Date of Patent: Apr. 29, 2014

(54) STAR WHEEL CONVEYOR OUTFEED MECHANISM AND METHOD

(75) Inventors: Scott M. Briggs, Horseheads, NY (US); Stephen Matthew Giometti, Horseheads, NY (US); Timothy W. Shay, Elmira, NY (US)

(73) Assignee: Emhart Glass S.A., Cham (CH)

( * ) Notice: Subject to any disclaimer, the term of this patent is extended or adjusted under 35 U.S.C. 154(b) by 441 days.

(21) Appl. No.: 13/004,269

(22) Filed: Jan. 11, 2011

(65) Prior Publication Data

US 2012/0175224 A1 Jul. 12, 2012

(51) Int. Cl.
*B65G 47/84* (2006.01)

(52) U.S. Cl.
USPC .......... 198/478.1; 198/473.1; 198/481.1

(58) Field of Classification Search
None
See application file for complete search history.

(56) References Cited

U.S. PATENT DOCUMENTS

| | | | |
|---|---|---|---|
| 3,957,154 A | * | 5/1976 | Shiba ............................ 198/394 |
| 5,058,724 A | * | 10/1991 | Hinton .......................... 198/376 |
| 5,082,105 A | | 1/1992 | Tincati |
| 5,540,320 A | | 7/1996 | Sarto et al. |
| 5,772,001 A | | 6/1998 | Otruba et al. |
| 6,557,695 B2 | | 5/2003 | Gerber et al. |
| 7,398,871 B1 | | 7/2008 | Basgil et al. |
| 7,832,546 B2 | | 11/2010 | Preti et al. |

\* cited by examiner

*Primary Examiner* — Kavel Singh
(74) *Attorney, Agent, or Firm* — Reinhart Boerner Van Deuren s.c.

(57) ABSTRACT

A method and apparatus for inspection of containers including a circular star wheel conveyor having a plurality of intermediate annular inspection pockets and at least one non-inspection position. The method includes the steps of providing an outfeed stripper configured to engage a container disposed in the non-inspection position aligning the outfeed stripper inside the circumference of the star wheel conveyor and aligning the outfeed stripper with the conveyor and with the rotational path of the star wheel. Positioning an outfeed mechanism adjacent to the star wheel conveyor and operating the outfeed mechanism at a desired conveyor speed. Controlling the movement of the star wheel conveyor to align the container with the outfeed stripper and the outfeed mechanism only at the non-inspection position regardless of the number of angular inspection positions.

14 Claims, 9 Drawing Sheets

STAR WHEEL CONVEYOR OUTFEED MECHANISM AND METHOD

BACKGROUND OF THE INVENTION

The present invention relates to container inspection machines and more particularly to a method and apparatus of controlling a transfer of a container from a circular star wheel conveyor of a container inspection apparatus onto a conveyor with a transfer apparatus.

The container inspection machine typically includes a conveyor that is configured to transport containers including inspection machine and a star wheel conveyor which accepts containers from the conveyor, inspects the container at various inspection positions and then discharges the container from the star wheel onto the conveyor for further handling and processing. The conveyor typically is linear and includes a screw transport which spaces containers on the conveyor and aligns the container with a pocket defined in the star wheel conveyor. In a typical star wheel conveyor configuration, the star wheel conveyor defines a plurality of intermediate angular positions and is configured to rotate about a central axis by an actuator, for example a servo motor. The star wheel conveyor receives a container from the linear conveyor rotates it at a discreet speed and is configured to make a number of stops, referred to as a dwell, with specific dwells in the inspection positions. The star wheel conveyor rotates until each container is inspected at the plurality of inspection positions until it reaches a position in which it is discharged from the star wheel conveyor by a transfer apparatus. The transfer apparatus is configured to move the container from the pocket of the star wheel conveyor onto the linear conveyor at a speed and attitude that will not damage the container or upset it from a specific orientation.

Because of different size and configuration of containers different star wheel conveyor configurations are utilized. The outside diameter of the star wheel conveyor is fixed and different sized bottles are accommodated by using a different number of pockets defined in the star wheel. The star wheel conveyor is in a fixed position with respect to the linear conveyor which delivers the containers to and removes the containers from the machine. It can be shown that in an 18 pocket star wheel conveyor there is a dwell position which places a container in contact with an outfeed stripper and outfeed wheel. Such continued configured allows the outfeed wheel to drive the bottle past the intersecting star wheel diameter while the star wheel dwells (stops) and before the next star wheel index or movement. However, for larger bottles, a 9 or 6 pocket star wheel conveyor is typically used in the controller of the servo motor drive of the star wheel conveyor does not provide for a dwell that will allow the outfeed stripper and outfeed wheel to discharge a container. In such conditions, the outfeed of the bottle is governed by the star wheel conveyor forcing the container against the outfeed stripper and the outfeed wheel which is running it a tangential speed matching the linear conveyor speed and since the star wheel conveyor tangential speed is much greater the additive velocity imported to the container by the tangential speed of the star wheel conveyor and the rotational speed of the outfeed wheel results in unpredictable container handling and possible damage.

It is known in the art to avoid the handling problem described above by reducing operational speed of one or more of the components of the inspection machine, i.e. the infeed screw, the linear conveyor, the star wheel conveyor speed or the outfeed wheel speed. Such compromised operational speed reduction reduces the efficiency of the inspection machine which typically operates in the range of 200-400 containers per minute. It is also known to provide in various mechanical guides in the outfeed area of the inspection machine in an attempt to stabilize container discharge over such mechanical devices at costs and setup time which further reduces the efficiency of the inspection machine.

The apparatus of the present disclosure must also be of construction which is both durable and long lasting, and it should also require little or no maintenance to be provided by the user throughout its operating lifetime. In order to enhance the market appeal of the apparatus of the present disclosure, it should also be of inexpensive construction to thereby afford it the broadest possible market. Finally, it is also an objective that all of the aforesaid advantages and objectives be achieved without incurring any substantial relative disadvantage.

SUMMARY OF THE INVENTION

The disadvantages and limitations of the background art discussed above are overcome by the present disclosure.

There is provided a method for transferring a container from an inspection machine to a conveyor. The inspection machine includes a circular star wheel conveyor having a plurality of intermediate annular inspection pockets and at least one non-inspection position.

The method includes providing an infeed screw. The infeed screw is configured to discharge the container into one of the angular inspection pockets of the star wheel conveyor. The infeed screw is configured to rotate at a predetermined speed.

The method further includes the steps of providing an outfeed stripper configured to engage a container disposed in the non-inspection position aligning the outfeed stripper inside the circumference of the star wheel conveyor and aligning the outfeed stripper with the conveyor and with the rotational path of the star wheel. An outfeed mechanism is positioned adjacent to the star wheel conveyor and operating the outfeed mechanism at a desired conveyor speed.

The star wheel conveyor movement is controlled to align the container with the outfeed stripper and the outfeed mechanism only at the non-inspection position for a predetermined time period regardless of the number of angular inspection pockets defined in the star wheel conveyor.

The outfeed mechanism engages the container and moves the container from the star wheel conveyor to the conveyor. The outfeed mechanism can include one of a wheel and a belt. The outfeed stripper can also be configured with a concave surface between a first and second end. The outfeed stripper may also be configured as a flexible serpentine belt conveyor.

There is also provided an inspection apparatus for containers including a circular star wheel conveyor having a plurality of intermediate angular pockets. The star wheel conveyor is configured to receive a container from an infeed screw and after an inspection process transfer the container to an outtake conveyor. The apparatus includes an outfeed stripper configured to engage the container disposed in a non-inspection position, wherein a portion of the outfeed stripper is disposed inside the circumference of the star wheel conveyor and aligned with the rotational path of the star wheel conveyor. Another portion of the outfeed stripper is aligned with the conveyor.

An outfeed mechanism is disposed adjacent the star wheel conveyor, with the outfeed mechanism configured to operate at a desired conveyor speed. A controller is coupled to the star wheel conveyor, the infeed screw, and the outfeed mechanism, with the controller configured to control the movement of the star wheel conveyor to align the container with the outfeed stripper and the outfeed mechanism only at the non-inspection position for a predetermined time period regardless of the number of angular inspection pockets defined in the star wheel conveyor. The outfeed mechanism engages the container and moves the container from the star wheel conveyor to the conveyor.

The outfeed mechanism may include one of the wheel and a belt. The outfeed stripper may include a member having a first end and a second end with the member defining a concave surface between the first and second ends. The outfeed stripper may also comprise a flexible serpentine belt conveyor.

There is additionally provided a method of controlling a transfer of a container from a circular star wheel conveyor of a container inspection apparatus onto a conveyor with a transfer apparatus.

The star wheel conveyor defines a plurality of intermediate angular pockets of at least one non-inspection position. The controller is coupled to the star wheel conveyor and the transfer apparatus, with the controller configured to control the movement of the star wheel conveyor. The method includes establishing in the controller a number of intermediate angular inspection pockets defined in the star wheel conveyor. The method also includes setting in the controller a dwell stop and moving the star wheel conveyor a number of dwell stops in relation to the number of angular inspection pockets to align the container with the transfer apparatus only at the non-inspection position wherein the transfer apparatus engages the container and transfer the container from the star wheel conveyor to the conveyor.

The transfer apparatus includes an infeed screw configured to discharge the container into one of the angular inspection pockets of the star wheel conveyor. The infeed screw is configured to rotate at a predefined speed in coordination with the star wheel conveyor rotation. The transfer apparatus also includes an outfeed stripper configured to engage the container at the non-inspection position wherein a portion of the outfeed stripper is disposed inside the circumference of the star wheel conveyor and aligned with the rotational path of the star wheel conveyor. The controller coordinates the speeds and positions of the infeed screw, outfeed stripper and the star wheel conveyor. Another portion of the outfeed stripper is aligned with the conveyor. An outfeed mechanism is disclosed adjacent to star wheel conveyor, with the outfeed mechanism configured to operate at a desired conveyor speed.

The apparatus of the present disclosure is of a construction which is both durable and long lasting, and which will require little or no maintenance to be provided by the user throughout its operating lifetime. The apparatus of the present disclosure is also of inexpensive construction to enhance its market appeal and to thereby afford it the broadest possible market. Finally, all of the aforesaid advantages and objectives are achieved without incurring any substantial relative disadvantage.

DESCRIPTION OF THE DRAWINGS

These and other advantages of the present disclosure are best understood with reference to the drawings, in which.

DETAILED DESCRIPTION OF THE EXEMPLARY EMBODIMENTS

Figure 1:
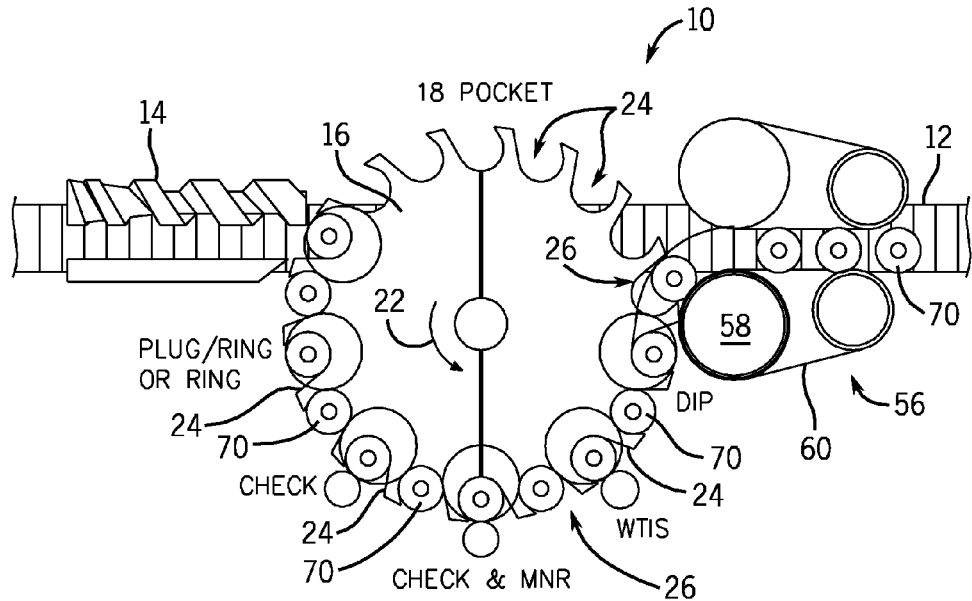
FIG. 1 is a schematic top view illustration of an exemplary embodiment of an inspection machine for containers including an eighteen pocket star wheel conveyor.

As part of a process of manufacturing containers, particularly glass containers, it is necessary to inspect the containers after they are molded to insure specific quality requirements for the containers. An inspection machine 10 typically provides inspection stations at which inspections of the glass container are performed on various portions of the container. One such inspection machine 10 includes what is referred to as a star wheel 16 which receives containers from a linear conveyor 12 rotates the containers with stops, also referred to as dwells, at which point an inspection takes place. As the circular star wheel 16 rotates about a rotational path 22, it stops or dwells at specific inspection points. Upon completion of all of the inspections, the container is off-loaded at a non-inspection position to transfer the container 70 back to the linear conveyor 12.

The size and configuration of the star wheel 16 depends on the type of bottle that is being moved through and inspected by the machine. In most inspection stops the bottle is rotated about its vertical longitudinal axis as will be discussed below, therefore, the openings, also referred to as inspection pockets 24 must be sized to accommodate the different sizes of containers, such as bottles.

Inspection machine 10 has a fixed position with respect to a linear conveyor 12 which delivers the containers 70 to and removes them from the inspection machine 10. Depending on the size of the bottle the star wheel 16 dwells or stops in a set number of fixed positions at which inspection operations take place. For example, star wheel 16 can have either 6, 9, or 18 pockets 24 and the star wheel dwells a corresponding number of times for one complete revolution. The dwell time is equal to the move time for all speeds and all pocket configurations. In an 18-pocket star wheel 16 the number of angular degrees between pockets is 20 degrees and can typically accommodate a 3-inch diameter bottle. (See FIG. 1) For a 9-pocket star wheel 16, the degrees between adjacent pockets is 40 degrees and typically can accommodate a bottle diameter of 5.25 inches. (See FIG. 2) In a 6-pocket star wheel 16, the degrees between pockets is 60 degrees and typically can accommodate a bottle that is 6.7 inches in diameter.

Figure 8:
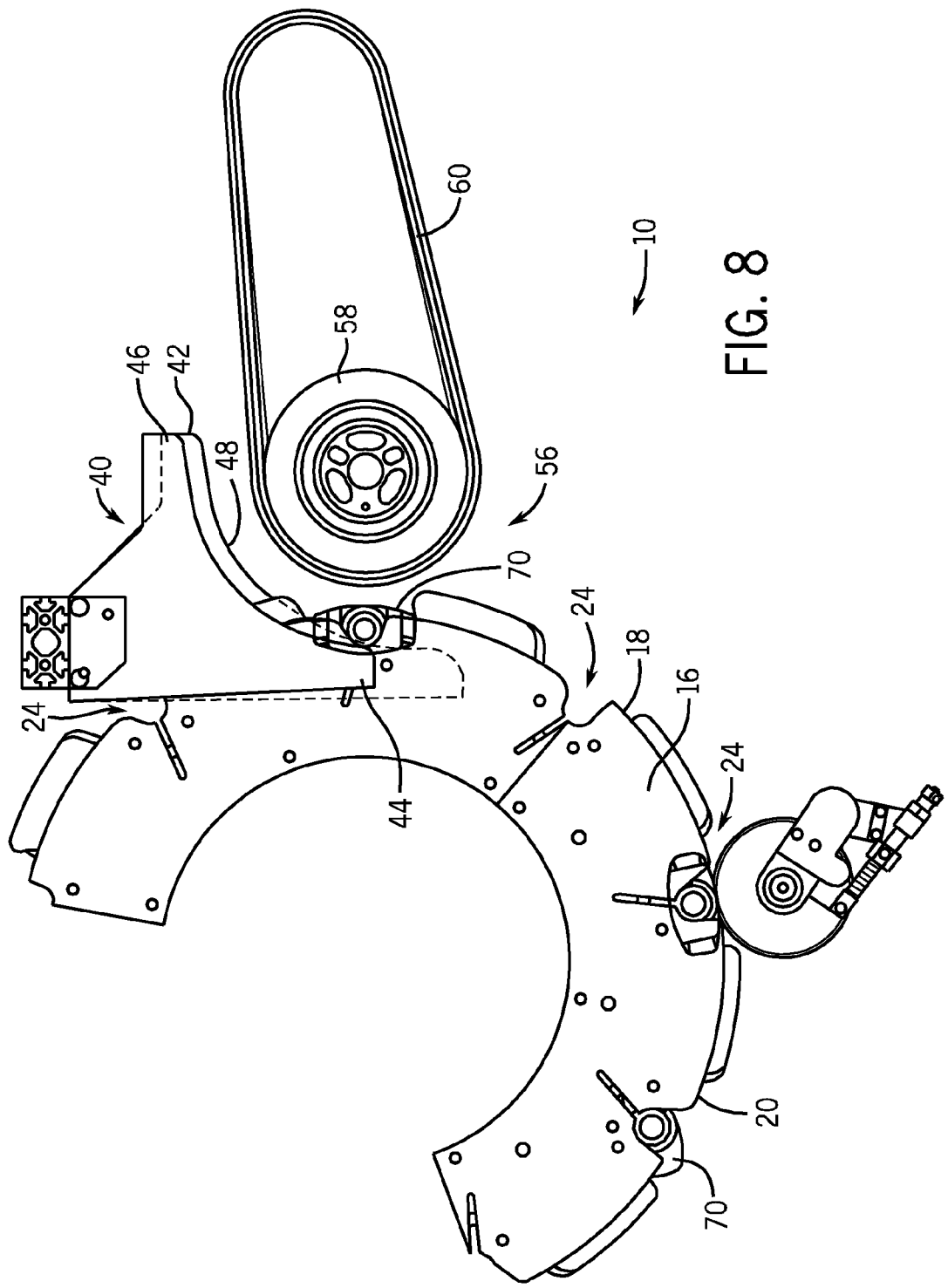
FIG. 8 is a partial top view of an exemplary embodiment of an inspection machine illustrating an outfeed mechanism including an outfeed stripper defining a concave surface and a wheel driven belt.
Figure 9:
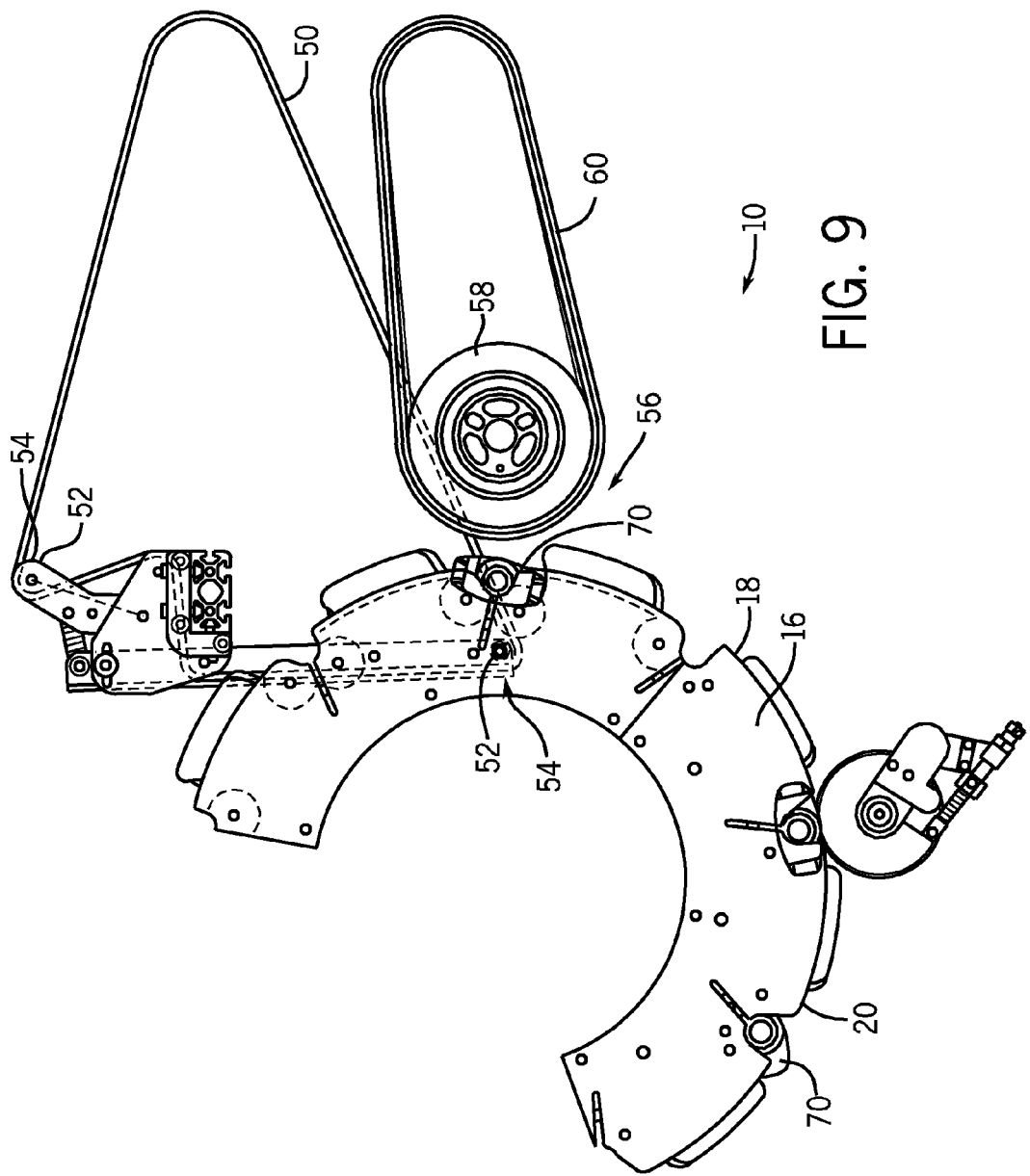
FIG. 9 is a partial top view of an exemplary embodiment of an inspection machine illustrating an outfeed mechanism including a flexible serpentine belt conveyor and at least one idler wheel.

When the various inspections of the container 70 are completed, the star wheel moves the container 70 to a non-inspection position 26 for out feeding of the container 70 back to the linear conveyor 12. (See FIGS. 1, 2, 8, and 9) The container is guided from the star wheel 16 to the conveyor 12 when it contacts an outfeed stripper 40 and outfeed mechanism 56. FIGS. 8 and 9 illustrate exemplary embodiments of an outfeed mechanism.

The outfeed mechanism illustrated in FIG. 8 includes an outfeed wheel 58 that is faced with a compliant, high friction surface that engages the container 70 and rolls the container against the outfeed stripper 40. A belt 60 moves the container along the outfeed stripper 40 to the linear conveyor 12. FIG. 9 illustrates a moving belt, typically a serpentine belt 50 that pinches the container 70 between the serpentine belt 50 and the belt 60 to move the container 70 onto the linear conveyor 12. The timing of movement of the star wheel 16 to the non-inspection position 26 is such to provide a dwell that allows the outfeed mechanism 56 to move the bottle past the intersecting star wheel diameter while the star wheel 16 dwells and before the next star wheel index movement.

When an inspection machine 10 is operating in an 18-pocket mode, the star wheel 16 has 18 pockets and it dwells 18 times in a 360 degree cycle. The amount of movement between dwells is 360 divided by the number of pockets, which in the 18-pocket mode is 20 degrees. When the star wheel is in the 9-pocket mode, the machine cycle provides 40 degree movements between dwells.

The position of the dwell locations are where the container 70 is fed into the star wheel 16 and the inspections are performed. Since the inspection locations are fixed relative to the star wheel 16 (see FIGS. 1 and 2), the dwell position at the outfeed, non-inspection position 26, is defined by the fixed positions of the inspection stations. Since the number of pockets in the star wheel 16 are governed by the size of the bottle (see above), adjustment to the speed of the infeed screw 14 governs the rotational movement of the star wheel 16 to make the various inspections, and provide that the container 70 is in the proper non-inspection position 26 to be off-loaded by the outfeed mechanism 56 during an appropriate dwell.

The inspection machine 10 monitors the position of the infeed screw 14, which rotates about a longitudinal axis parallel to the linear conveyor 12 and is configured to deliver a container 70 from the conveyor 12 to a pocket of the star wheel 16.

Figure 2:
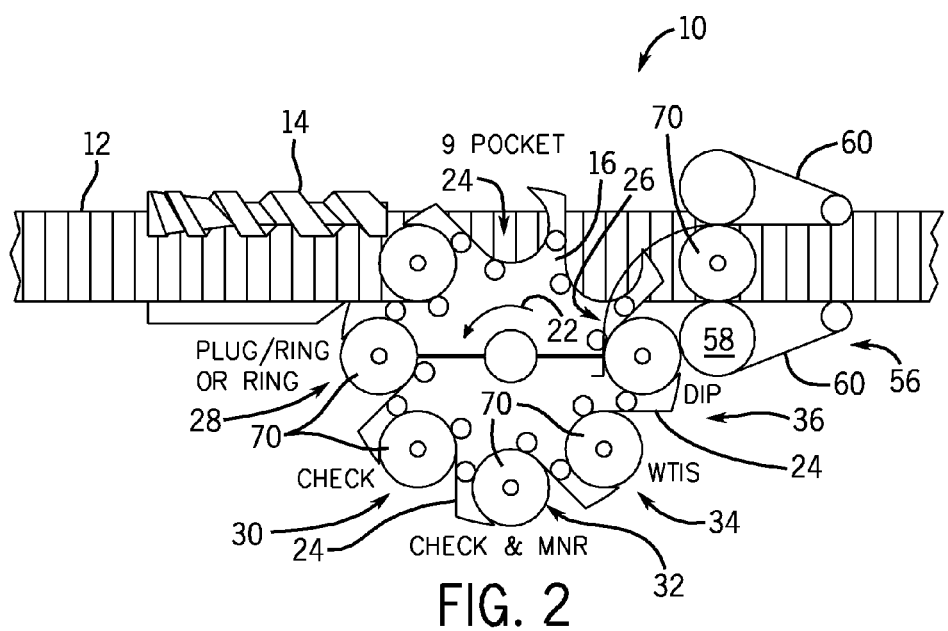
FIG. 2 is a schematic top view of the inspection machine illustrated in FIG. 1 including a nine pocket star wheel conveyor.
Figure 3:
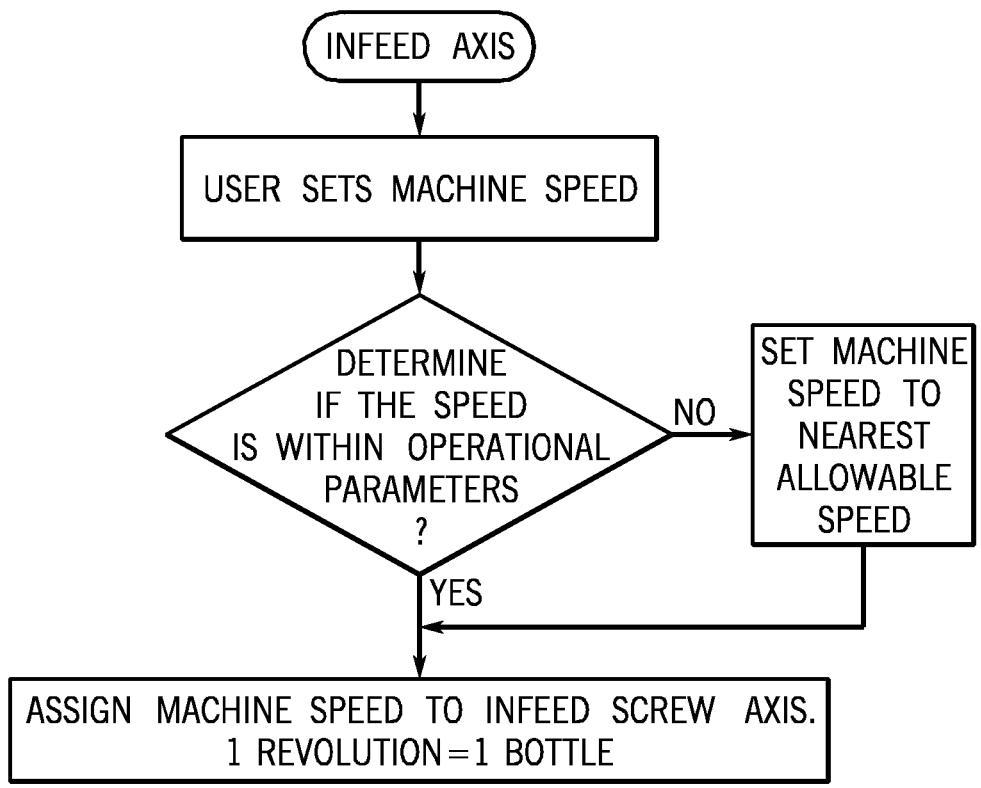
FIG. 3 is a flow chart of an exemplary embodiment of a process for setting the speed of an infeed screw based on the speed of the inspection machine illustrated in FIGS. 1 and 2.
Figure 4:
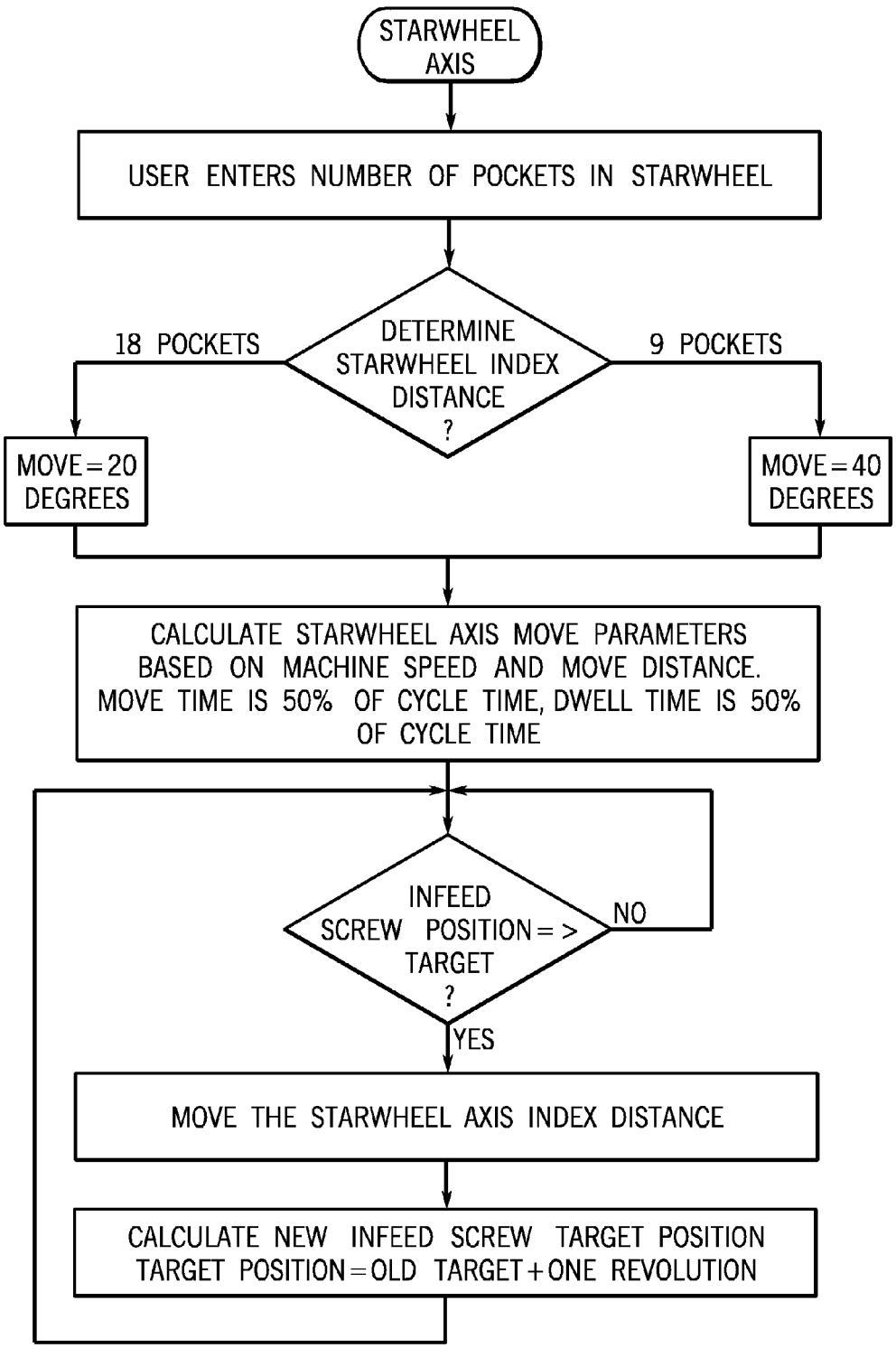
FIG. 4 is a flow chart of an exemplary embodiment of a process for setting the index moves of a star wheel conveyor of the inspection machine illustrated in FIGS. 1 and 2.

FIG. 3 illustrates a flow chart of a process for setting the speed of the infeed screw 14 based on the speed of the inspection machine 10. FIG. 4 illustrates a flow chart of a process for setting the index moves of the star wheel 16 of the inspection machine 10 illustrated in FIGS. 1 and 2. FIG. 4 illustrates how the speed of the star wheel 16 is adjusted depending on whether an 18-pocket star wheel or a 9-pocket star wheel is used.

In a typical arrangement with an 18-pocket star wheel 16, the non-inspection position 26 typically aligns properly with the outfeed stripper 40 and outfeed mechanism 56 to allow the container 70 to be moved to the linear conveyor 12 in a configuration that allows it to be further processed. However, when a 9 or 6-pocket star wheel 16 is utilized, the convenient non-inspection position 26 is typically not available. As usually happens, the outfeed of the container 70 is governed by the star wheel 16 forcing the container against the outfeed mechanism 56 since the outfeed wheel 58 is running at a tangential speed matching the conveyor 12, whereas the star wheel 16 tangential speed is usually much greater. The situation results in unpredictable container handling which is a persistent problem for these operational modes.

In the past, a compensation method was to operate the outfeed mechanism 56 at a much higher rate than the conveyor 12 in an attempt to better match the star wheel tangential speed. This resulted in a poor transfer when the container transitioned from the star wheel 16 to the conveyor 12. An alternative compensation method is the utilization of various mechanical guides to lend additional support in the outfeed mechanism portion of the inspection machine 10 in an attempt to stabilize the bottle as it was outfed from the star wheel 16 to the conveyor 12. Such additional mechanical guides added cost and set-up time which is detrimental to the overall operation of the container inspection process.

Figure 7:
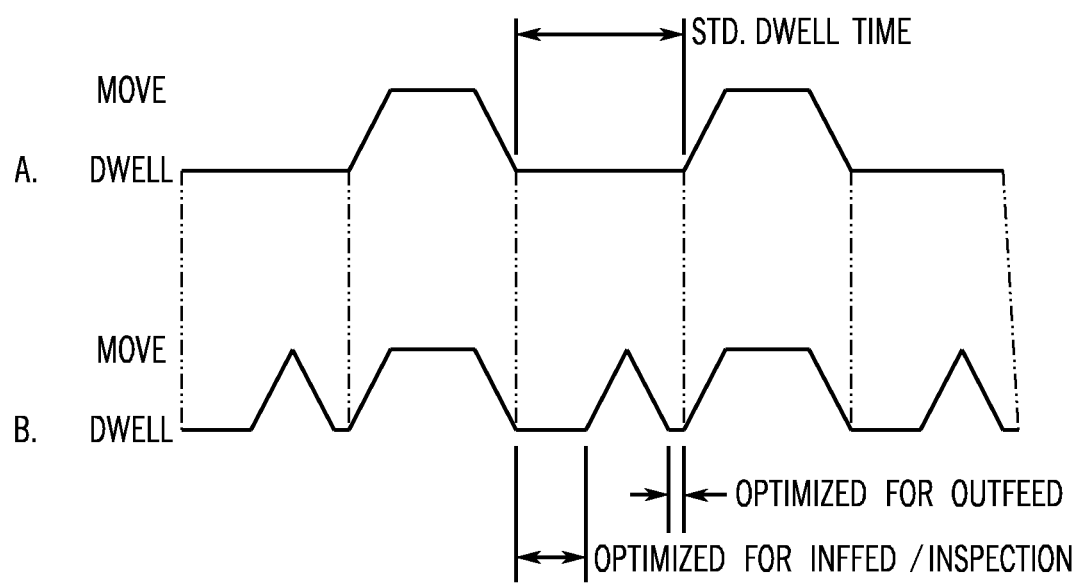
FIG. 7 is an exemplary embodiment of a move/dwell chart, with the A. portion illustrating a conventional operation of an 18 pocket star wheel conveyor, and with the B. portion illustrating an optimized operation of the inspection machine illustrated in FIG. 2 to coordinate the rotational speed of the infeed screw with the movement of the star wheel conveyor.

FIG. 7 illustrates a move/dwell chart where the A trace illustrates a conventional operation of an 18-pocket star wheel conveyor and the B trace illustrates an optimized operation of the inspection machine illustrated in FIG. 2 to coordinate the rotational speed of the infeed screw with the movement of the star wheel conveyor. The conventional dwell time is divided into a dwell time period, a move time and a short dwell time period.

Additional concerns which create handling problems at the outfeed portion of the inspection machine 10 is the cross sectional shape of the container. If the container is round its rotation about its vertical axis is smooth and regular. However, if the container has a rectangular or oval cross section, for example a flask, the container can be trapped between the star wheel 16 and the outfeed stripper 40 of the outfeed. If the container 70, such as a flask, is trapped, the speed of the outfeed mechanism 56 and the speed of the star wheel 16 tends to squeeze the bottle out and shoot it along the outfeed path which could cause instability and cause the container to tip and fall over. Such condition can also cause an inconsistent spacing between the containers which affects post inspection processing of the containers. It is an objective of the present disclosure to provide a mechanism that avoids these problems and provides a consistent spacing and orientation of the containers, regardless of size and shape, for further processing after the inspection machine 10 process.

Figure 5:
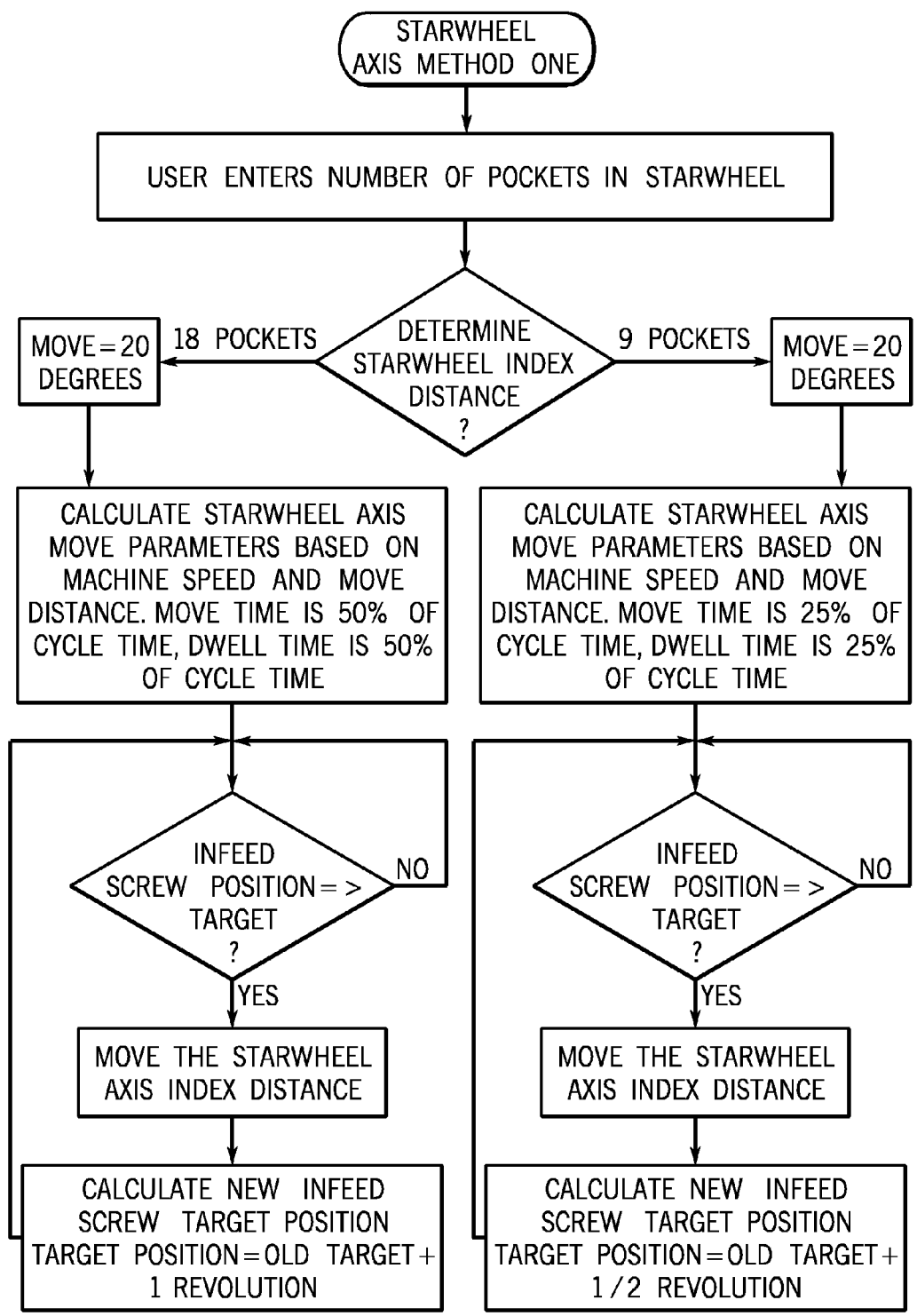
FIG. 5 is a flow chart of an exemplary embodiment of a process for setting the index moves of a star wheel conveyor of the inspection machine illustrated in one of FIG. 1 and FIG. 2.

To achieve the objectives as described above, in the case of a 9-pocket star wheel 16, the inspection machine 10 has one full dwell position in between a normal 9-pocket dwell configuration. The star wheel 16 now indexes 20 degrees rather than 40 degrees between dwells. FIG. 5 illustrates a flow chart of a process for setting the indexing moves of a star wheel 16 conveyor of the inspection machine 10 illustrated in FIGS. 1 and 2 with either a 18 or 9-pocket star wheel 16. In such configuration, the infeed screw 14 is run at half its normal speed. In such configuration, the container 70 is loaded into a pocket of the star wheel 16 when the star wheel 16 dwells at the infeed position rather than a dwell that is between inspection stations. Such arrangement provides dwell at the 20 degree position in the outfeed which would be same for a 9 or 18-pocket move. The outfeed mechanism 56, particularly the belt 60 or the serpentine belt 50 now moves the container out of the star wheel 16 and into the take-away section of the outfeed mechanism 56 without the pinching effect described above. It is noted that the container through-put of the inspection machine is effectively halved and the endfeed handling is compromised due to the mismatch of speeds between the infeed screw 14 and the star wheel 16.

Figure 6:
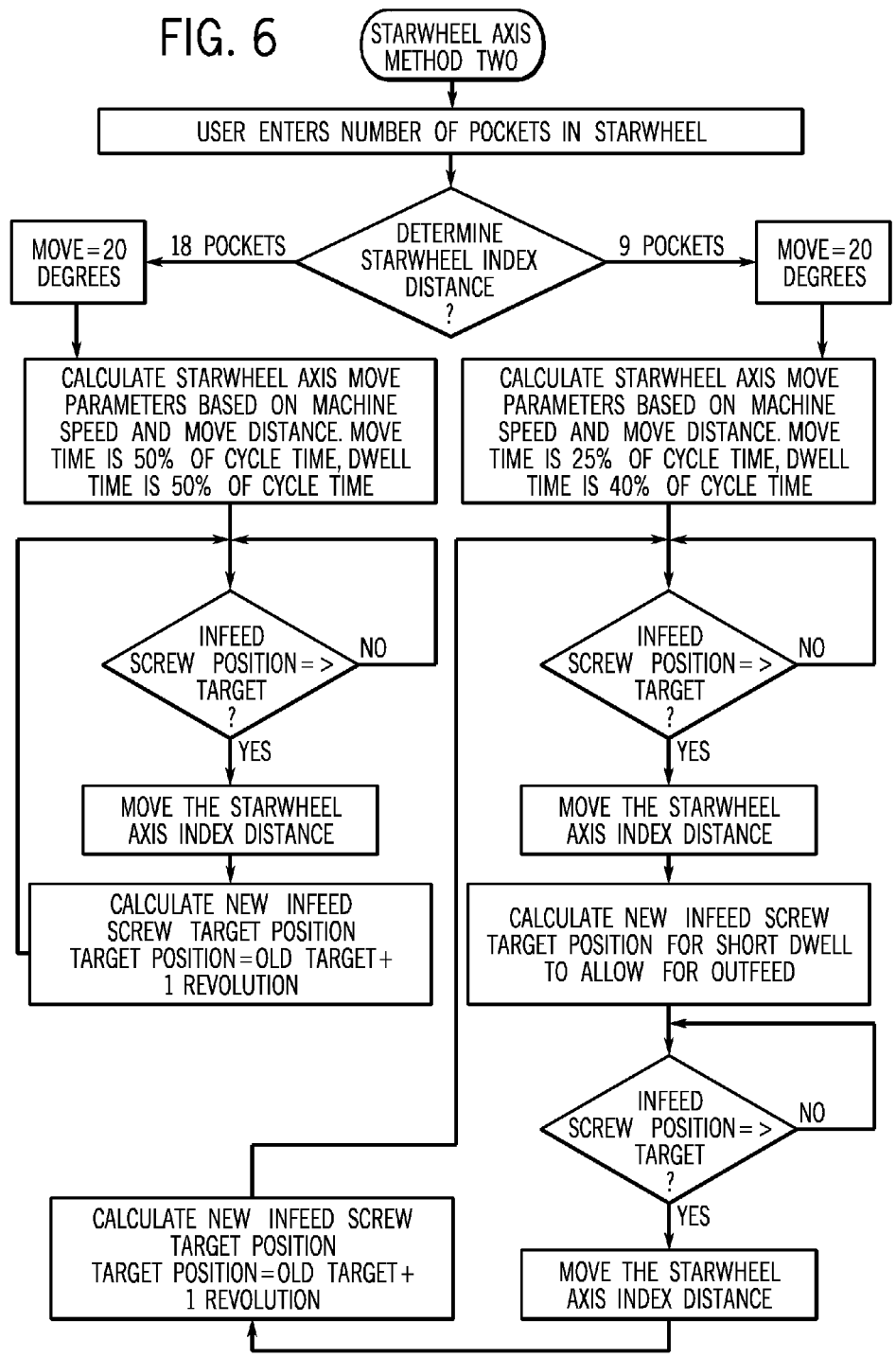
FIG. 6 is a flow chart of an exemplary embodiment of a process for setting the index moves of a star wheel conveyor of the inspection machine illustrated in one of FIG. 1 and FIG. 2 to optimize the infeed and outfeed move distance and dwell time based on the number of pockets in the star wheel.

An alternative method illustrated in FIG. 6 which sets out a flow chart for the process of setting the index moves of the star wheel 16 in the inspection machine 10 illustrated in FIGS. 1 and 2 to optimize the infeed and outfeed move distance and dwell time based on the number of pockets in the star wheel. An 18-pocket and 9-pocket star wheel example is illustrated in FIG. 6. It should be understood that a similar process for a 6-pocket star wheel is also applicable in this arrangement. In this configuration, the infeed timing is closer to the timing to allow the outfeed mechanism 56 to remove the container 70 with the container in the non-inspection position 26 after the inspection at the plurality of inspection pockets of the inspection machine 10. It has been determined that this alternative method is faster than the method illustrated with FIG. 5 with the handling of the containers on the outfeed portion of the inspection process improved. However, either of the methods illustrate FIGS. 5 and 6 are an improvement over conventional methods.

Throughout the above description of the various operational modes of the inspection machine 10, reference has been made to various inspection positions of the inspection machine 10. In a typical inspection machine a plurality of inspection stations are set up in fixed positions around the circumference 18 of the star wheel 16. As the star wheel rotates and stops and dwells at each inspection station, the container 70 is rotated about its vertical axis by rotating a mechanism (not shown).

A typical inspection set-up includes a plug/ring gauger 28. The station mechanically measures the inner diameter of the mouth of the container 70. It is a finger-like go-no go-type gauge. The ring gauge attaches to the plug gauge and mechanically checks the outer diameter of the mouth of the container. Like the plug gauger, the ring gauger is a go-no go-type gauge. The ring gauge is configured in a ring and the plug gauger is configured as a finger-like device.

Another inspection station is the check detection device 30. This station performs check inspections. Checks are cracks in glass. This station typically performs check inspection by shining lights at the bottle in certain areas of interest. If there are cracks (or checks) they will reflect the light in a direction where sensors are positioned as the bottle rotates about its vertical axis in the specific inspection station. If the sensors detect a reflection, the machine 10 interprets this as a defect. As the container continues through the inspection machine 10 to the off-feed mechanism 56, it is moved to the linear conveyor 12 and will be ejected because of the check detection. This is an example of a reason for maintaining proper spacing and orientation of a container 70 being off-loaded or off-fed from the inspection machine 12 onto the linear conveyor 12.

Another inspection station is the check and mold number reader station 32. This station performs check detection as described above but it also has a mold number reader installed that detects the mold code in the bottom of the bottle as the bottle is rotated. The mold code is a series of dots that are formed in the heel of the bottle that enable the inspection machine 10 to determine what mold a bottle comes from and correlates defects it sees to the molds that produce the bottle. By coordinating any defects with a particular mold allows the operator to have the mold repaired or replaced to avoid further production of defective containers.

Another inspection station is the wall fitness inspection station 34. The wall thickness station 34 uses light to measure the thickness of the glass of certain points while the bottle is rotated about its vertical axis. Sensors position around the station detect the light used for measuring the thickness of the glass wall. It is also common to have an additional check inspection mechanism at this station.

A further inspection station is the dipped finish detector 36. This station fills the bottle full of air and determines if air leaks out of the bottle, indicating that the sealing surface of the container has a dip (defect) in the sealing surface. If the sealing surface is not perfectly flat the container will not be properly sealed and any fluids in the bottle could leak out.

It should be understood that other or additional inspection stations and inspect types of inspection mechanisms can be utilized and that the above are exemplary inspection stations that can be utilized with the different type of bottles and star wheels in an inspection machine 10.

There is disclosed in this application, a method for transferring a container 70 from an inspection machine 10 to a conveyor 12. The inspection machine 10 includes circular star wheel conveyor 16 having a plurality of intermediate angular inspection pockets 26 and at least one non-inspection position 26.

An infeed screw 14 is provided and is configured to discharge a container 70 into one of the angular inspection pockets 24 of the star wheel conveyor 16, with the infeed screw 14 configured to rotate at a predefined speed.

An outfeed stripper 40 is provided and configured to engage the container disposed in the non-inspection position 26. The outfeed stripper 40 is aligned inside the circumference 18 of the star wheel conveyor 16 and aligned with the conveyor 12 and with the rotational path 22 of the star wheel 16.

An outfeed mechanism 56 is positioned adjacent to the star wheel conveyor 16. The outfeed mechanism 56 is operated at a desired conveyor speed to match the speed of the linear conveyor 12.

Figure 10:
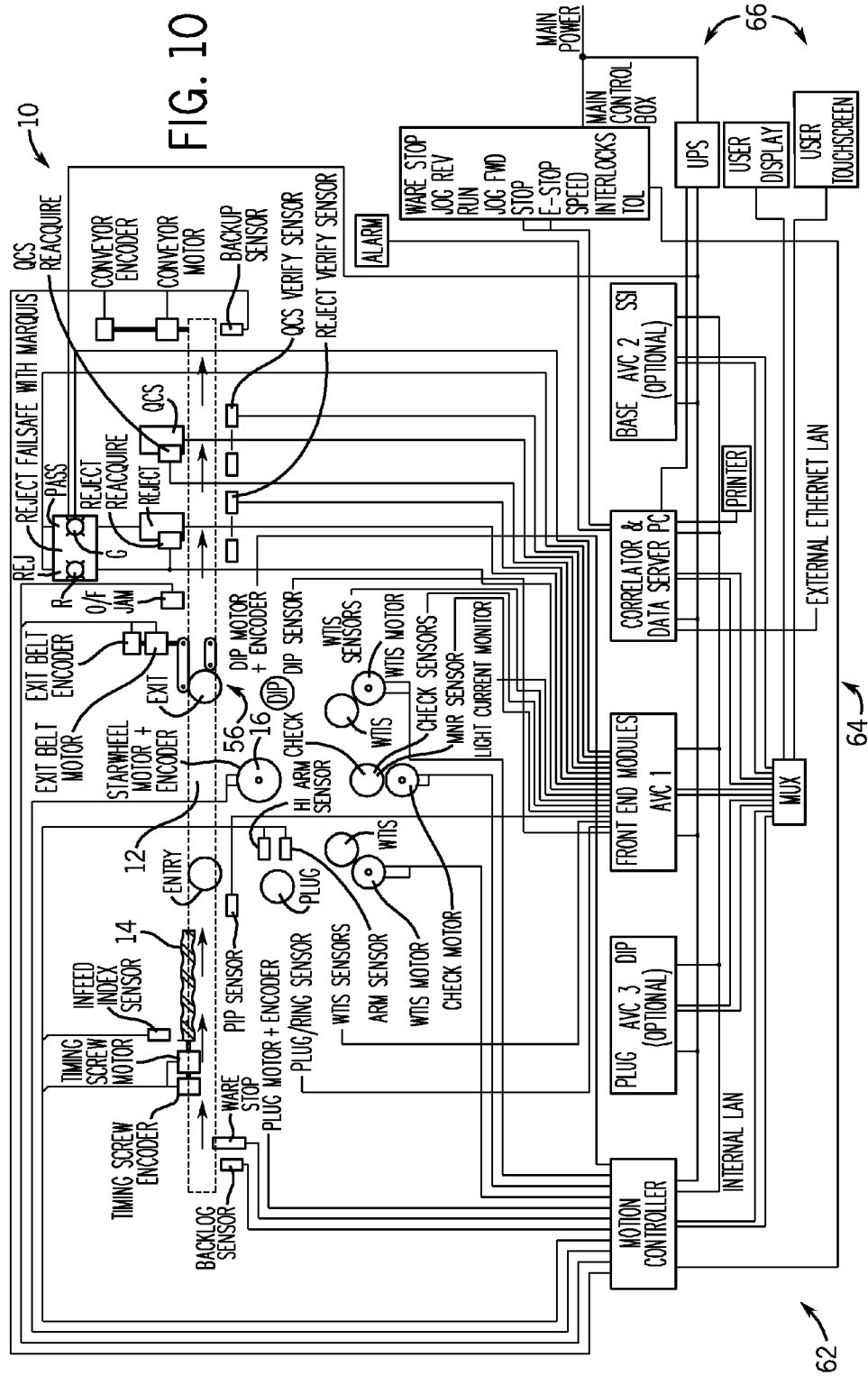
FIG. 10 is a schematic of an exemplary embodiment of a controller system for the inspection machine illustrated in one of FIG. 1 and FIG. 2.

The movement of the star wheel conveyor 16 is controlled by a controller 62. The controller 62 is configured to align the container 70 with the outfeed stripper 40 and the outfeed mechanism 56 only at the non-inspection position 26 for a predetermined time period (dwell time) regardless of the number of angular inspection positions 24 defined in the star wheel conveyor 16. The outfeed mechanism 56 engages the container 70 and moves the container 70 from the star wheel conveyor 16 to the linear conveyor 12. FIG. 10 illustrates an exemplary embodiment of a controller system for a controller 62 for an inspection machine 10.

In one embodiment, the outfeed mechanism 56 of the inspection machine 10 includes one of a wheel 58 and a belt 60. In another embodiment of the outfeed mechanism 56 of an inspection machine 10 a member 42 having a first end 44 and a second end 46, with the member 42 defining a concave surface 48 between the first and second ends 44, 46 is included. In this embodiment of the outfeed mechanism 56, the first end 44 of the outfeed stripper 40 is aligned linearly with the conveyor 12 and the second end 46 of the outfeed stripper 40 is aligned with the rotational path 22 of the start wheel conveyor 16.

In either of the two above-described outfeed mechanisms 56, the outfeed stripper 40 is a flexible serpentine belt conveyor 50. The flexible serpentine belt 50 is supported by a plurality of wheels 52 including an idler wheel 54 positioned inside the perimeter 20 of the star wheel 16 conveyor with the flexible serpentine belt 50 conveyor aligned traverse to a rotational path 22 of the star wheel conveyor 16.

In operating the inspection machine 10, the controller 62 receives data from a database 64, typically with an interface 66 device, to establish the number of intermediate angular inspection positions 24 defined in the star wheel conveyor 16. The controller is also configured through the interface 66, with the number of dwell stops and the time of each dwell stop for the rotation of the star wheel 16. The controller 62 controls the movement of the star wheel conveyor 16 the number of dwell stops in relation to the number of angular inspection positions 24 to align a container 70 with the outfeed mechanism 56 also referred to as a transfer apparatus. Such transfer apparatus engages a container 70 and transfers the container 70 from the star wheel conveyor 16 to the linear conveyor 12.

The controller 62 may be a microprocessor mounted on or in a separate housing mounted on the inspection apparatus 10. The controller 62 may also be a server coupled to an array of peripherals or a desktop computer, or a laptop computer. It is also contemplated that the controller is configured to control the inspection station as well as the conveyor speeds and may be remote from the inspection apparatus 10. Communication between the controller 62 and the inspection machine 10 may be either by hardwire or wireless devices. The memory/database 64 may be remote from the controller 62. The controller 62 typically includes an interface 66, such as input device, for example a mouse, or a keyboard, and a display device, for example a monitor screen or a smart phone. Such devices can be hardwired to the controller or connected wirelessly with appropriate software, firewave, and hardware. The display device may also include a printer coupled to the controller 62. The display device may be configured to mail or fax reports as determined by a user. The controller 62 may be coupled to a network, for example, a local area network or a wide area network, which can be one of a hardwire network and a wireless network, for example a Bluetooth network or internet network, for example, by a WIFI connection or "cloud" connection.

The transfer apparatus 56 includes an outfeed stripper 40 configured to engage the container at a non-inspection position 26. The outfeed stripper 40 is disposed inside the circumference 18 of the star wheel conveyor 16 and aligned with the rotational path 22 of the star wheel conveyor 16. Another portion of the outfeed stripper 40 is aligned with the conveyor and an outfeed mechanism is disposed adjacent to the star wheel conveyor 16 with the outfeed mechanism configured to operate at a desired conveyor speed. The desired conveyor speed is to coordinate the rotational speed of the star wheel conveyor 16 and the linear conveyor 12 to maintain proper spacing and orientation of the containers as they exit the inspection machine 10.

For purposes of this disclosure, the term "coupled" means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or the two components and any additional member being attached to one another. Such adjoining may be permanent in nature or alternatively be removable or releasable in nature.

Although the foregoing description of the present apparatus and method has been shown and described with reference to particular embodiments and applications thereof, it has been presented for purposes of illustration and description and is not intended to be exhaustive or to limit the disclosure to the particular embodiments and applications disclosed. It will be apparent to those having ordinary skill in the art that a number of changes, modifications, variations, or alterations to the disclosure as described herein may be made, none of which depart from the scope of the present apparatus and method. The particular embodiments and applications were chosen and described to provide the best illustration of the principles of the disclosure and its practical application to thereby enable one of ordinary skill in the art to utilize the disclosure in various embodiments and with various modifications as are suited to the particular use contemplated. All such changes, modifications, variations, and alterations should therefore be seen as being within the scope of the present disclosure as determined by the appended claims when interpreted in accordance with the breadth to which they are fairly, legally, and equitably entitled.

What is claimed is:

1. An inspection apparatus for containers of different sizes conveyed by different interchangeable circular starwheel conveyors having different numbers of intermediate angular pockets, the starwheel conveyors each being configured to receive a respective container from an infeed screw and after an inspection process to transfer the container to an outtake conveyor, the apparatus comprising:
    an interchangeable starwheel installed in a section apparatus, wherein the installed interchangeable starwheel comprises one of:
        a first circular starwheel conveyor having a first plurality of intermediate angular pockets for conveying a first plurality of containers of a first size; and
        a second circular starwheel conveyor having a second plurality of intermediate angular pockets different from the first plurality of intermediate angular pockets for conveying a second plurality of containers of a second size different than the first size;
    an outfeed stripper configured to engage the containers disposed in the installed interchangeable starwheel, wherein a portion of the outfeed stripper is configured to be disposed inside the circumference of the installed interchangeable starwheel conveyor and aligned with the rotational path of the installed interchangeable starwheel conveyor and wherein the outfeed stripper includes another portion configured to be aligned with the outtake conveyor;
    an outfeed mechanism configured to be disposed adjacent the installed interchangeable starwheel conveyor, with the outfeed mechanism configured to operate at a desired conveyor speed; and
    a controller configured to be coupled to the installed interchangeable starwheel conveyor, the infeed screw, and the outfeed mechanism, with the controller configured to control the rotational movement of the installed interchangeable starwheel conveyors in different predetermined rotational degree movements associated with the particular installed interchangeable starwheel conveyor between dwells of the inspection process wherein inspection of the container occurs and to align the container with the outfeed stripper and the outfeed mechanism for a predetermined time period,
    wherein the outfeed mechanism engages the containers and moves the containers from the installed interchangeable starwheel conveyor to the conveyor.

2. The apparatus of claim 1, wherein the outfeed mechanism includes one of a wheel and a belt.

3. The apparatus of claim 1, with the outfeed stripper comprising a member having a first end and a second end, with the member defining a concave surface between the first and second end.

4. The apparatus of claim 3, wherein the first end of the outfeed stripper is configured to be aligned linearly with the installed interchangeable conveyor and the second end of the outfeed stripper is configured to be aligned with the rotational path of the installed interchangeable starwheel conveyor.

5. The apparatus of claim 1, with the outfeed stripper comprising a flexible serpentine belt conveyor.

6. The apparatus of claim 5, wherein the flexible serpentine belt is configured to be supported by a plurality of wheels including an idler wheel configured to be positioned inside the perimeter of the installed interchangeable starwheel conveyor, wherein the flexible serpentine belt conveyor is configured to be located traverse to the rotational path of the installed interchangeable starwheel conveyor.

7. An inspection apparatus for containers including an interchangeable circular starwheel conveyor having a plurality of pockets, the starwheel conveyor configured to receive a container from an infeed screw into one of the plurality of pockets, transport the container to from the infeed screw to an inspection station, and transport the container from the inspection station to a conveyor, the apparatus comprising:
- an outfeed mechanism including a belt configured to engage the container in the one of the plurality of pockets; and
- a controller configured to receive an indication of how many pockets the starwheel conveyor has, to determine based on the location of the inspection station, the location of the conveyor, and an amount of time that the container will remain at the inspection station a rotation schedule for the starwheel conveyor, and based on the determination control the rotation of the starwheel conveyor to control the movement of the container from the infeed screw to an inspection station and from the inspection station to the conveyor.

8. The inspection apparatus of claim 7, wherein during a time when the container is in the pocket of the starwheel conveyor, the controller is configured to cause the starwheel conveyor to move approximately 50% of the time and to remain stationary approximately 50% of the time.

9. The inspection apparatus of claim 7, wherein the inspection apparatus is configured to receive the indication of how many pockets the starwheel conveyor has from a user through an interface.

10. The inspection apparatus of claim 7, wherein the controller is configured to cause the starwheel conveyor to rotate for a first time period, to cause the starwheel conveyor to remain stationary for a second time period, and to cause the starwheel conveyor to rotate for a third time period, the third time period being shorter than the first time period.

11. The inspection apparatus of claim 10, wherein the controller is configured to cause the starwheel conveyor to remain stationary for a fourth time period, the fourth time period being shorter than the second time period.

12. The inspection apparatus of claim 10, wherein the controller is configured to control the infeed screw to move the container into the one of the plurality of pockets during the second time period.

13. The inspection apparatus of claim 10, wherein the controller is configured to control the starwheel conveyor to locate the container at the inspection station during the second time period.

14. The inspection apparatus of claim 11, wherein the controller is configured to control the starwheel conveyor to locate the container at the outfeed mechanism for moving the container from the one of the plurality of pockets to the conveyor during the fourth time period.

* * * * *